United States Patent [19]

Aitken

[11] Patent Number: 5,064,460

[45] Date of Patent: Nov. 12, 1991

[54] BLUE TRANSPARENT GLASS-CERAMIC ARTICLES

[75] Inventor: Bruce G. Aitken, Erwin, N.Y.

[73] Assignee: Corning Incorporated, Corning, N.Y.

[21] Appl. No.: 604,177

[22] Filed: Oct. 29, 1990

[51] Int. Cl.$^5$ ............... C03C 10/00; C03C 10/14; C03C 10/16

[52] U.S. Cl. ............................... 65/33; 501/3; 501/4

[58] Field of Search ................ 501/3, 4; 65/33

[56] References Cited

U.S. PATENT DOCUMENTS

| | | | |
|---|---|---|---|
| 3,642,504 | 2/1972 | Petzold et al. | 501/4 |
| 4,009,042 | 2/1977 | Rittler | 501/4 |
| 4,018,612 | 4/1977 | Chyung | 501/4 |
| 4,084,974 | 4/1978 | Beall et al. | 501/4 |
| 4,192,688 | 3/1980 | Babcock et al. | 501/7 |

Primary Examiner—Mark L. Bell
Attorney, Agent, or Firm—C. S. Janes, Jr.

[57] ABSTRACT

This invention is directed to the formation of blue-to-black transparent glass-ceramic articles containing β-quartz solid solution as essentially the sole crystal phase present therein. The articles are prepared by heat treating reduced precursor glass articles consisting essentially, in weight percent, of 2.5–5% $Li_2O$, 1–2% MgO, 18–30% $Al_2O_3$, 2–4% $TiO_2$, 1–4% $ZrO_2$, 48–70% $SiO_2$, 1–12% $P_2O_5$, and 0–2% ZnO. The precursor glass articles are placed in a reduced state through the inclusion of a sufficient amount of a hydrogen-containing phosphate and/or chloride and/or $Ti_2O_3$ to obtain about 0.2–6% of the total titanium content in the form of $Ti^{+3}$ ions.

6 Claims, No Drawings

BLUE TRANSPARENT GLASS-CERAMIC ARTICLES

RELATED APPLICATION

U.S. application Ser. No. 604,184, filed concurrently herewith by Robert Morena and Linda R. Pinckney under the title BLUE/GRAY TRANSPARENT GLASS-CERAMIC ARTICLES, discloses the preparation of ZnO-free, silicate-based transparent glass-ceramic articles exhibiting a blue or gray coloration through the presence of $Ti^{+3}$ ions wherein chloride ions are included to fine the precursor glass and to reduce $Ti^{+4}$ ions therein to $Ti^{+3}$ ions.

BACKGROUND OF THE INVENTION

Glass-ceramic articles have been marketed commercially for over 30 years. The initial disclosure of such articles is found in U.S. Pat. No. 2,920,961 (Stookey). As is explained in that patent, glass-ceramic articles are prepared via the heat treatment of precursor glass bodies. Thus, producing glass-ceramic articles comprehends three general steps: (1) a glass forming batch customarily containing a nucleating agent is melted; (2) that melt is cooled to a temperature below the transformation range thereof and, concurrently with said cooling, a glass article of a desired geometry is shaped therefrom; and (3) that glass article is exposed to a heat treatment schedule to crystallize the glass in situ. Commonly, the heat treatment involves two stages; viz., the glass article is initially heated for a time at a temperature somewhat above the transformation range to cause the generation of nuclei therein after which the temperature is raised to above the annealing point and, frequently, in excess of the softening point of the glass to effect the growth of crystals on the previously-generated nuclei. The process yields products which are typically highly crystalline, the crystals being fine-grained, substantially uniform in size, and homogeneously distributed throughout the minor amount of residual glassy phase.

Whereas Pat. No. 2,920,971 is directed to the preparation of opaque glass-ceramic articles and the sales of opaque glass-ceramic articles have far exceeded those of transparent glass-ceramic articles, there has been a large market for transparent glass-ceramic articles, one such product being cookware marketed by Corning Incorporated, Corning, New York under the trademark VISIONS ®. That product is manufactured under U.S. Pat. No. 4,018,612 (Chyung), which patent covers compositions within a narrow range of the $Li_2O$-MgO-ZnO-$Al_2O_3$-$SiO_2$ system nucleated with a combination of $TiO_2$ and $ZrO_2$ to yield highly crystalline articles containing $\beta$-quartz solid solution as the primary crystal phase.

Recent marketing studies have indicated the desirability of developing a transparent glass-ceramic body suitable for cookware exhibiting a soft blue tint. U.S. Pat. No. 4,018,612 notes the possible inclusion of glass colorants in the original glass composition, specifically referring to cobalt, chromium, copper, iron, manganese, nickel, and vanadium U.S. Pat. No. 4,192,688 (Babcock et al.) also discusses the use of glass colorants in glass-ceramic articles. The latter patent points out that the colors produced in a glass-ceramic body are frequently quite different from the color present in the precursor glass body. And the color of a transparent glass-ceramic body employing the same coloring agent will frequently be different from that displayed in an opaque glass-ceramic body. To illustrate, cobalt has long been recognized as imparting a blue color to glass, but in a transparent glass-ceramic the color becomes lavender and in an opaque glass-ceramic the color is a very pale blue. In another example a combination of cobalt and nickel imparts an amber color to the parent glass article, but the transparent glass-ceramic article derived therefrom exhibits a cranberry red hue and the opaque glass-ceramic body produced therefrom a blue shade.

The production of colored transparent glass-ceramic articles containing $\beta$-quartz solid solution as the primary crystal phase from precursor glasses having base compositions within the lithium aluminosilicate system nucleated with $TiO_2$ is described in U.S. Pat. No. 4,084,974 (Beall et al.). As is disclosed there, a carbonaceous reducing agent (expressly discussing the utility of carbon, starch, and sucrose) is included in the glass forming batch such that, during melting, some of the $Ti^{+4}$ ions will be reduced to $Ti^{+3}$ ions Thereafter, when the glass body is heat treated to crystallize in situ the resulting transparent glass-ceramic will exhibit a blue-to-black color.

Whereas the operability of that procedure was evidenced repeatedly on a small laboratory scale, it proved difficult to control in large scale commercial production. Thus, problems in fining of the glass melt were encountered and variations in physical properties such as the coefficient of thermal expansion were witnessed.

Therefore, the principal objective of the instant invention was to develop transparent glass-ceramic articles containing $\beta$-quartz solid solution as the predominant crystal phase exhibiting a linear coefficient of thermal expansion (25°–600° C.) less than $10 \times 10^{-7}/°$ C., preferably less than $6 \times 10^{-7}/°$ C., and displaying a soft blue coloration without the use of a carbonaceous reducing agent.

SUMMARY OF THE INVENTION

That objective can be achieved in glass-ceramic bodies having compositions circumscribed within narrow ranges of the reduced system $Li_2O$-MgO-$Al_2O_3$-$SiO_2$-$P_2O_5$ with, optionally, ZnO which utilize $TiO_2$ and $ZrO_2$ as nucleating agents. Thus, the precursor glasses are prepared in a reducing condition by employing a hydrogen-containing phosphate as a batch source of $P_2O_5$, $Ti_2O_3$ as a batch source for the nucleating agent $TiO_2$, chloride as a batch source as a fining agent and to reduce the glass, or a combination of those batch sources. The reduced glasses exhibit a grayish coloration in contrast to the light amber color conventionally observed in the unreduced, $TiO_2$-containing glass. When heat treated to cause the glass to crystallize in situ, the resulting transparent glass-ceramics can manifest a soft blue color. This blue coloration has been adjudged to be due to a broad absorption of radiation by $Ti+3$ ions which attains a maximum in the red portion of the visible spectrum (700–800 nm). The presence of $Ti^{+3}$ ions has been confirmed through EPR spectroscopy; which analysis has indicated that about 0.2–6% of the total titanium is present in a reduced state. Transparent glass-ceramics containing $Ti^{+3}$ ion concentrations at levels within the high end of this range manifest a very dark blue coloration, which, in articles having thick cross sections, gives them a glossy black appearance.

Arsenic has customarily been employed as the fining agent for glasses having compositions within the above system. Arsenic must be excluded from the present glass compositions in order to assure that $Ti^{+3}$ ions are not re-oxidized to $Ti^{+4}$ ions, thereby destroying the desired blue coloration. That is, glasses of similar compositions which include $As_2O_3$, when nominally reduced through the presence of $Ti_2O_3$, chloride, and/or a hydrogen-containing phosphate in the batch, do not yield transparent glass-ceramic bodies demonstrating a blue color. Furthermore, the arsenic-containing precursor glass bodies display the light amber tint conventionally observed in unreduced, $TiO_2$-containing glasses, whereas the arsenic-free, reduced precursor glasses of the present invention exhibit a grayish color.

The inclusion of $P_2O_5$ in the glass composition lowers the viscosity of the glass, thereby rendering it more fluid at a given melting temperature and, hence, essentially self-fining. For example, when up to 10% $SiO_2$ in a $P_2O_5$-free glass is replaced by its molar equivalent of $AlPO_4$, which replacement corresponds to an increase in $P_2O_5$ content from 0 to about 5% by weight, the temperature at which the glass melt attains a viscosity of $10^3$ poises falls by about 40° C. Similarly, by replacing up to 15% $SiO_2$ by its molar equivalent of $AlPO_4$, which replacement corresponds to an increase in $P_2O_5$ content from 0 to about 7.5% by weight, that temperature is reduced by about 70° C. (Because the component $AlPO_4$ is soluble in the $\beta$-quartz crystal structure, which crystals comprise essentially the sole crystal phase present in the inventive glass-ceramics, the inclusion of $P_2O_5$ has virtually no effect upon the extent of the crystallization developed.)

It has been postulated that a redox reaction, such as has been set out below, takes place between reduced phosphorus species and $Ti^{+4}$ species during melting of the inventive glasses, that reaction buffering the concentration of $Ti^{+3}$ ions:

$$P^{+3}+2Ti^{+4}=P^{+5}+2Ti^{+3}$$

The blue transparent glass-ceramics of the present invention are very highly crystalline, generally greater than 75% by volume crystalline, and the presence of $Ti^{+3}$ ions has virtually little effect upon the mechanical properties of the final products. For example, $\beta$-quartz solid solution-containing glass-ceramic articles can be prepared with linear coefficients of thermal expansion in the neighborhood of $1 \times 10^{-7}/°$ C. Such materials are suitable for top-of-stove cookware.

The process for producing the inventive glass-ceramic articles consists essentially of three basic steps:

(1) a batch for a glass consisting essentially, expressed in terms of weight percent on the oxide basis, of 2.5-5% $Li_2O$, 1-2% MgO, 0-2% ZnO, 18-30% $Al_2O_3$, 2-4% $TiO_2$, 1-4% $ZrO_2$, 48-70% $SiO_2$, and 1-12% $P_2O_5$ is melted, said batch including as a reducing agent a hydrogen-containing phosphate, $Ti_2O_3$, chloride, or a combination of a hydrogen-containing phosphate, chloride, and $Ti_2O_3$;

(2) said melt is cooled to a temperature below the transformation range thereof and simultaneously therewith a glass body of a desired configuration is shaped therefrom; and (3) said glass body is heated to a temperature between about 850°-950° C. for a period of time sufficient to develop crystallization in situ of $\beta$-quartz solid solution crystals.

Sufficient hydrogen-containing phosphate, chloride, and/or $Ti_2O_3$ will be included in the parent glass compositions to assure that about 0.2-6% of the titanium present therein will be in the form of $Ti^{+3}$ ions. In general, an amount of hydrogen-containing phosphate required to provide at least 1% by weight $P_2O_5$ has been found necessary to assure sufficient reducing action when $Ti_2O_3$ is not used as a batch material. $Ti_2O_3$ batched at levels between about 0.5-2.5% have proven satisfactory when used alone. Those amounts result in about 0.004-0.24% $Ti_2O_3$ in the final glass. A suitable amount of chloride-containing material will be incorporated to assure that about 0.2-0.5% by weight chloride will be retained in the final glass. Typically, that amount requires the use of chloride-containing batch material at levels sufficient to yield about 1-5% chloride.

Customarily, in order to produce a glass-ceramic body of quite high crystallinity in which the crystals are very uniformly fine-grained, the parent glass articles will first be heated to a temperature somewhat above the annealing point thereof, e.g., about 750°-825° C., for a period of time to cause the development of nuclei in the glass, following which the temperature is raised to grow crystals on those nuclei. The inventive compositions crystallize rapidly; typically, exposure of the precursor glass to one hour in the nucleation range of temperatures and one hour in the crystallization range will yield a highly crystalline, very fine-grained product.

PRIOR ART

U.S. Pat. No. 3,642,504 (Petzold et al.) is directed to the preparation of transparent glass-ceramic articles exhibiting a yellow-brown coloration and containing a quartz solid solution as the predominant crystal phase from parent glass compositions consisting essentially, expressed in terms of weight percent on the oxide basis, of 2-5% $Li_2O$, 0-0.6% $Na_2O$, 0-4% MgO, 0-5% ZnO, 0.5-1% $As_2O_3$, 17-32% $Al_2O_3$, 35-70% $SiO_2$, 1.5-6% $TiO_2$, 0.5-3% $ZrO_2$, and 5-17% $P_2O_5$. The required inclusion of $As_2O_3$ places the compositions outside of those of the instant invention. Furthermore, the patent makes no reference to reduced glass compositions to lead to products displaying a blue color.

U.S. Pat. No. 4,009,042 (Rittler) described the formation of transparent glass-ceramic articles through the heat treatment of parent glass articles consisting essentially, in weight percent, of 3-4% $Li_2O$, 20-30% $Al_2O_3$, 50-65% $SiO_2$, 3-7% $TiO_2$, 1.5-3% $ZrO_2$, and 2-5% $P_2O_5$. The patent mentions the optional inclusion of coloring agents, but makes no reference to the inclusion of a hydrogen-containing phosphate and/or $Ti_2O_3$ and/or chloride to place the parent glass in a reduced condition.

DESCRIPTION OF PREFERRED EMBODIMENTS

Table I lists a group of precursor glass compositions, expressed in terms of parts by weight of the materials utilized in formulating the glass forming batches. Table IA reports the compositions in terms of parts by weight on the oxide basis as calculated from the batch materials. Inasmuch as the sum of the individual components closely approximates 100, for all practical purposes the values recited in Table IA can be deemed to represent weight percent. It will be appreciated that, except for the required presence of a hydrogen-containing phosphate, chloride, and/or $Ti_2O_3$, the actual batch ingredients can comprise any materials, either the oxides or other compounds which, when melted together, will be converted into the desired oxide in the proper proportions. This is illustrated in the use of spodumene (classic formula $Li_2O \cdot Al_2O_3 \cdot 4SiO_2$) and/or amblygonite (classic formula $2LiF \cdot Al_2O_3 \cdot P_2O_5$) as a batch material to supply concentrations of $Li_2O$, $Al_2O_3$, and $SiO_2$, and $Li_2O$, $Al_2O_3$, and $P_2O_5$, respectively. Other illustrations include $Li_2CO_3$ for $Li_2O$, $Li_2HPO_4$ for $Li_2O$ and $P_2O_5$, $MgCO_3$ for MgO, $MgHPO_4$ for MgO and $P_2O_5$, $Al(PO_3)_3$ for $Al_2O_3$ and $P_2O_5$, and $NH_4H_2PO_4$ and $(NH_4)_2HPO_4$ for $P_2O_5$.

The batch materials were compounded, ballmilled together to assist in obtaining a homogeneous melt, and charged into platinum crucibles. The crucibles were moved into a furnace operating at about 1600°–1650° C. and the batches melted for about 16 hours. The melts were then poured into steel molds to form glass slabs having dimensions of about 6″×4″×0.75″ or 4″×4″×0.75″ which were immediately transferred to an annealer operating at about 650°–700° C. Samples of the necessary size and geometry for various testing procedures were cut from the annealed slabs.

TABLE I

|  | 1 | 2 | 3 | 4 | 5 | 6 | 7 |
|---|---|---|---|---|---|---|---|
| Spodumene | 461 | 461 | 408 | 408 | 292 | 315 | 544 |
| Amblygonite | — | — | — | — | — | 103 | — |
| $Al(PO_3)_3$ | 100 | — | 73 | — | 10 | — | 48 |
| $Al_2O_3$ | 72 | 91 | 73 | 87 | 73 | 116 | 107 |
| $SiO_2$ | 73 | 73 | 152 | 152 | 357 | 384 | 203 |
| MgO | 12 | 12 | 10 | 10 | 16 | 15 | 14 |
| $TiO_2$ | — | 19 | — | 19 | — | 25 | 25 |
| $ZrO_2$ | 19 | 19 | 19 | 19 | 20 | 25 | 25 |
| $Ti_2O_3$ | 17 | — | 17 | — | 18 | — | — |
| $NH_4H_2PO_4$ | — | 131 | — | 96 | — | 31 | — |
| ZnO | — | — | — | — | 8 | 10 | — |
| $(NH_4)_2HPO_4$ | — | — | — | — | — | — | 75 |

|  | 8 | 9 | 10 | 11 | 12 | 13 |
|---|---|---|---|---|---|---|
| Spodumene | 387 | 385 | 385 | 274 | 237 | 267 |
| $Al(PO_3)_3$ | — | 17 | 51 | 83 | 83 | 33 |
| $Al_2O_3$ | 114 | 130 | 142 | 97 | 106 | 76 |
| $SiO_2$ | 401 | 353 | 307 | 237 | 258 | 323 |
| MgO | 19 | 19 | 18 | 12 | 10 | 19 |
| ZnO | 10 | 10 | 10 | — | — | 10 |
| $ZrO_2$ | 19 | 25 | 25 | 23 | 23 | 19 |
| $TiO_2$ | 27 | 25 | 25 | 19 | 19 | 27 |
| $(NH_4)_2HPO_4$ | 49 | 74 | 74 | — | — | — |
| LiCl | — | — | — | 15 | 15 | 25 |

TABLE IA

|  | 1 | 2 | 3 | 4 | 5 | 6 | 7 |
|---|---|---|---|---|---|---|---|
| $SiO_2$ | 49.6 | 49.6 | 55.5 | 55.5 | 68.4 | 60.7 | 55.5 |
| $P_2O_5$ | 10.8 | 10.8 | 7.9 | 7.9 | 1.0 | 5.2 | 7.9 |
| $Al_2O_3$ | 28.3 | 28.3 | 25.9 | 25.9 | 19.1 | 23.2 | 25.9 |
| $Li_2O$ | 4.5 | 4.5 | 4.0 | 4.0 | 2.7 | 3.1 | 4.0 |
| MgO | 1.5 | 1.5 | 1.3 | 1.3 | 2.0 | 1.5 | 1.3 |
| $TiO_2$ | 2.5 | 2.5 | 2.5 | 2.5 | 2.5 | 2.5 | 2.5 |
| $ZrO_2$ | 2.5 | 2.5 | 2.5 | 2.5 | 2.5 | 2.5 | 2.5 |
| ZnO | — | — | — | — | 1.0 | 1.0 | — |
| F | — | — | — | — | — | 0.3 | — |

|  | 8 | 9 | 10 | 11 | 12 | 13 |
|---|---|---|---|---|---|---|
| $SiO_2$ | 65.1 | 60.2 | 55.6 | 55.2 | 54.7 | 65.1 |
| $P_2O_5$ | 2.7 | 5.4 | 8.1 | 8.9 | 8.8 | 2.7 |
| $Al_2O_3$ | 21.7 | 23.5 | 25.4 | 24.8 | 24.6 | 21.7 |
| $Li_2O$ | 2.8 | 2.8 | 2.8 | 3.4 | 3.0 | 2.8 |
| MgO | 1.8 | 1.8 | 1.8 | 1.5 | 1.4 | 1.8 |
| ZnO | 1.0 | 1.0 | 1.0 | — | 1.2 | 1.0 |
| $TiO_2$ | 2.7 | 2.5 | 2.5 | 2.5 | 2.5 | 2.7 |
| $ZrO_2$ | 1.9 | 2.5 | 2.5 | 3.0 | 3.0 | 1.9 |
| Cl | — | — | — | 1.7 | 1.7 | 2.1 |

Whereas the above description reflects work conducted under laboratory conditions, it will be appreciated that the glass batches can be melted and glass bodies formed therefrom utilizing large scale commercial glassmaking practices. For example, the glass slabs of the above examples were annealed to room temperature to permit visual inspection of glass quality and to cut samples for physical property measurements. Thus, it is much easier to cut the slabs in the glassy state than after they have been crystallized in situ. It must be recognized that cooling of the glass slabs to room temperature is not demanded in order to subsequently develop the desired highly crystalline products. Rather, it is only necessary that the melts be cooled below the transformation range of the glass to produce a virtually crystal-free glass body, and thereafter the crystallization heat treatment begun. The transformation range has generally been defined as that temperature at which a liquid melt is deemed to have become an amorphous solid, that temperature commonly being held as residing in the vicinity of the annealing point of a glass.

Table II records the nucleation and crystallization heat treatment schedule applied to each of the glass slabs and the test samples cut therefrom. Although individual dwell periods at specific temperatures are customarily employed in the laboratory as a matter of convenience, that practice is not required. It is only necessary that the glass be exposed to temperatures within the nucleation and crystallization intervals for a sufficient length of time to secure substantial nucleation and crystallization. In the schedules reported in Table II, the glass bodies were heated in an electrically-fired furnace at a rate of about 5° C./minute to the listed hold periods. At the conclusion of the crystallization treatment, the electric current to the furnace was cut off and the glass-ceramic articles allowed to cool to room temperature while being retained within the furnace. It has been estimated that this rate of cooling averages about 3°–5° C./minute. It will be appreciated that much more rapid rates of cooling are possible inasmuch as the coefficients of thermal expansion are below $10 \times 10^{-7}/°$ C. Thus, cooling at this "furnace rate" is a matter of convenience only.

Table II also records a visual description of each crystallized example (Ex.), the linear coefficient of thermal expansion (Exp.) as measured over the temperature range of 25°–600° C. expressed in terms of $\times 10^{-7}/°$ C., and the amount of titanium present as $Ti^{+3}$ ions as a percentage of the total titanium content.

X-ray diffraction analyses have indicated the articles to be highly crystalline, commonly greater than 75% by volume. The individual crystals are typically smaller than 300 nm in diameter so as to assure transparency in the product. X-ray diffraction analyses have also identified β-quartz solid solution as essentially the sole crystal phase present. A very minor amount of a zirconium titanate crystal phase has been observed.

TABLE II

| Ex. | Heat Treatment | Description | Exp. | % $Ti^{+3}$ |
|---|---|---|---|---|
| 1 | Hold 1 hour at 775° C. Hold 1 hour at 900° C. | Black | — | — |
| 2 | Hold 1 hour at 900° C. | Black | — | 1.5 |
| 3 | Hold 1 hour at 900° C. | Black | ≈2 | 5.6 |
| 4 | Hold 1 hour at 900° C. | Soft blue | 1.4 | 0.6 |
| 5 | Hold 1 hour at 900° C. | Dark blue | ≈6 | — |
| 6 | Hold 1 hour at 800° C. Hold 1 hour at 890° C. | Soft blue | 5.1 | 0.3 |
| 7 | Hold 1 hour at 890° C. | Dark blue | 2.2 | 2.8 |
| 8 | Hold 1 hour at 890° C. | Black | 6.2 | — |
| 9 | Hold 1 hour at 890° C. | Dark blue | 8.1 | 2.6 |
| 10 | Hold 1 hour at 890° C. | Black | — | — |
| 11 | Hold 1 hour at 775° C. | Soft blue | 6.9 | 0.2 |

TABLE II-continued

| Ex. | Heat Treatment | Description | Exp. | % Ti$^{+3}$ |
|---|---|---|---|---|
|  | Hold 1 hour at 900° C. |  |  |  |
| 12 | Hold 1 hour at 900° C. | Soft blue | — | — |
| 13 | Hold 1 hour at 800° C. | Inky blue | 6.7 | 0.3 |
|  | Hold 1 hour at 890° C. |  |  |  |

The preferred base composition intervals consist essentially of 2.8-4.4% Li$_2$O, 1.2-1.8% MgO, 20-30% Al$_2$O$_3$, 2-3% TiO$_2$, 0-1.5% ZnO, 1.5-3% ZrO$_2$, b 48-67% SiO$_2$, and 2-10% P$_2$O$_5$. Example 7 is considered to be the most preferred composition.

I claim:

1. A method for making a transparent blue-to-black glass-ceramic article exhibiting a linear coefficient of thermal expansion (25°-600° C.) less than $10 \times 10^{-7}/°$ C. and containing β-quartz solid solution as essentially the sole crystal phase present consisting essentially of the steps:

(a) melting a batch for a glass which is crystallizable in situ consisting essentially, expressed in terms of weight percent on the oxide basis, of 2.5-5% Li$_2$O, 1-2% MgO, 18-30% Al$_2$O$_3$, 2-4% TiO$_2$, 1-4% ZrO$_2$, 48-70% SiO$_2$, 1-12% P$_2$O$_5$, and 0-2% ZnO, and a glass reducing agent in an amount at least sufficient to reduce about 0.2-6% of the total titanium content to Ti$^{+3}$ ions, said reducing agent being selected from the group consisting of a hydrogen-containing phosphate, Ti$_2$O$_3$, chloride, and a mixture thereof;

(b) cooling said melt to a temperature below the transformation range thereof and simultaneously forming a glass body therefrom; and thereafter (c) heating said glass body to a temperature between about 850°-950° C. for a period of time sufficient to cause the crystallization in situ of β-quartz solid solution crystals.

2. A method according to claim 1 wherein said chloride is present in an amount of 1-5% by weight.

3. A method according to claim 1 wherein said hydrogen-containing phosphate is selected from the group consisting of (NH$_4$)$_2$HPO$_4$ and NH$_4$H$_2$PO$_4$.

4. A method according to claim 1 wherein said Ti$_2$O$_3$ is present in an amount of about 0.5-2.5%.

5. A method according to claim 1 wherein said glass consists essentially of 2.8-4.4% Li$_2$O, 1.2-1.8% MgO, 20-30% Al$_2$O$_3$, 2-3% TiO$_2$, 0-1.5% ZnO, 1.5-3% ZrO$_2$, 48-67% SiO$_2$, and 2-10% P$_2$O$_5$.

6. A method according to claim 1 wherein said glass body is first heated to a temperature between about 750°-825° C. for a period of time sufficient to cause the development of nuclei therein, after which the glass body is heated to a temperature between about 850°-950° C. for a period of time sufficient to cause the growth of β-quartz solid solution crystals on those nuclei.

* * * * *